United States Patent
Ikeda et al.

(10) Patent No.: US 8,582,404 B2
(45) Date of Patent: Nov. 12, 2013

(54) RECORDING MEDIUM, REPRODUCTION AND RECORDING METHOD, REPRODUCTION AND RECORDING DEVICE

(75) Inventors: Masakazu Ikeda, Odawara (JP);
Koichiro Nishimura, Sagamihara (JP);
Yutaka Nagai, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/577,320

(22) PCT Filed: Nov. 10, 2010

(86) PCT No.: PCT/JP2010/070009
§ 371 (c)(1),
(2), (4) Date: Aug. 6, 2012

(87) PCT Pub. No.: WO2011/108147
PCT Pub. Date: Sep. 9, 2011

(65) Prior Publication Data
US 2012/0307607 A1    Dec. 6, 2012

(30) Foreign Application Priority Data
Mar. 5, 2010  (JP) ................. 2010-048577

(51) Int. Cl.
*G11B 7/00*    (2006.01)
(52) U.S. Cl.
USPC ...................... 369/47.1; 369/47.27

(58) Field of Classification Search
USPC .......... 369/44.13, 30.11, 30.03, 59.25, 275.2, 369/275.3, 44.26, 47.1, 47.27, 94, 275.4
See application file for complete search history.

(56) References Cited

U.S. PATENT DOCUMENTS

| 6,519,217 B1 | 2/2003 | Kawashima et al. |
| 8,159,906 B2 * | 4/2012 | Ikeda et al. ............. 369/30.01 |

FOREIGN PATENT DOCUMENTS

| JP | 2001-167562 | 6/2001 |
| JP | 2008-41243 | 2/2008 |
| JP | 2008-523534 | 7/2008 |
| JP | 2010-186507 | 8/2010 |
| JP | 2010-198663 | 9/2010 |
| JP | 2010-198665 | 9/2010 |
| JP | 2011-187096 | 9/2011 |
| JP | 2011-187097 | 9/2011 |
| JP | 2011-187098 | 9/2011 |
| WO | WO 2006/061736 A1 | 6/2006 |
| WO | WO 2008/060104 A1 | 5/2008 |

* cited by examiner

*Primary Examiner* — Nabil Hindi
(74) *Attorney, Agent, or Firm* — Antonelli, Terry, Stout & Kraus, LLP.

(57) ABSTRACT

Obtain an expanded address without altering the bit number of an address which is embedded in a wobble. Generate a virtual bit which is not recorded on a disc, and which is expressed by the disparity from the rules and the presence or absence of information embedded in part or all of the wobble address.

6 Claims, 9 Drawing Sheets

Layer 0-3 (201)

| | | | | | |
|---|---|---|---|---|---|
| PAAW 23-22 (104) | 00b/01b/10b/11b ||||||
| PAAW 21-2 | 00000h | 00001h | 00002h | ... | FFFFFh |
| PAAW 1-0 | 00b\|01b\|10b | 00b\|01b\|10b | 00b\|01b\|10b | ... | 00b\|01b\|10b |
| PAA 24 (103) | 0b |||||
| PAA 23-22 | 00b/01b/10b/11b |||||
| PAA 21-2 | 00000h | 00001h | 00002h | ... | FFFFFh |
| PAA 1-0 | 00b\|01b\|10b | 00b\|01b\|10b | 00b\|01b\|10b | ... | 00b\|01b\|10b |

Layer 4-7 (202)

| | | | | | |
|---|---|---|---|---|---|
| PAAW 23-22 (104) | 00b/01b/10b/11b |||||
| PAAW 21-2 | 00000h | 00001h | 00002h | ... | FFFFFh |
| PAAW 1-0 | 11b\|10b\|01b | 11b\|10b\|01b | 11b\|10b\|01b | ... | 11b\|10b\|01b |
| PAA 24 (103) | 1b |||||
| PAA 23-22 | 00b/01b/10b/11b |||||
| PAA 21-2 | 00000h | 00001h | 00002h | ... | FFFFFh |
| PAA 1-0 | 00b\|01b\|10b | 00b\|01b\|10b | 00b\|01b\|10b | ... | 00b\|01b\|10b |

|  |  | 16 address | | | | |
|---|---|---|---|---|---|---|
|  |  | 0 | 1 | : | S | : | 15 |
| 9 bytes | 102 AUN | $AF_{0,0}$ | $AF_{0,1}$ | : | $AF_{0,S}$ | : | $AF_{0,15}$ |
|  |  | $AF_{1,0}$ | $AF_{1,1}$ | : | $AF_{1,S}$ | : | $AF_{1,15}$ |
|  |  | : | : | : | : | : | : |
|  | 1301 | $AF_{3,0}$ | $AF_{3,1}$ | : | $AF_{3,S}$ | : | $AF_{3,15}$ |
|  | flag bits | $AF_{4,0}$ | $AF_{4,1}$ | : | $AF_{4,S}$ | : | $AF_{4,15}$ |
|  | 1302 parities | $AF_{5,0}$ | $AF_{5,1}$ | : | $AF_{5,S}$ | : | $AF_{5,15}$ |
|  |  | : | : | : | : | : | : |
|  |  | $AF_{8,0}$ | $AF_{8,1}$ | : | $AF_{8,S}$ | : | $AF_{8,15}$ |

RECORDING MEDIUM, REPRODUCTION AND RECORDING METHOD, REPRODUCTION AND RECORDING DEVICE

TECHNICAL FIELD

The present invention relates to a recording medium on which addresses are recorded, for example, an optical disc, a reproduction and recording method for an optical disc, and reproduction device and recording device for recording and reproducing data on and from a recording medium.

BACKGROUND ART

In FIG. 6 of Patent Document 1, a correlation of address information on a Blue-ray Disc is shown and the description "since an address unit number (AUN) cooperates with a physical sector number, and cooperates with a physical ADIP (Address In Pre-groove) address as shown in FIG. 6, it is usefully used as reference information for retrieving a recording position" is shown in the paragraph [0010]. According to the drawing, although a physical sector number (PSN) which is allocated as one address to sector-based data and a physical ADIP address (PAA) which is embedded in wobbles have a relation 32*PSN=3*PAA, 5 bits from bit 31 to bit 27 of the PSN are not allocated as bits corresponding to the PAA.

PRIOR ART DOCUMENT

Patent Document

Patent Document 1: Japanese Patent Application Laid-Open No. 2008-41243

SUMMARY OF THE INVENTION

Problems to be Solved by the Invention

In bit allocation as in Patent Document 1, when the PSN exceeds a data volume which is expressed by conventional 27 bits, the bit number of the PAA to be embedded in wobbles is insufficient. When the bit number of the PAA is to be expanded, large-scale reconstruction of a wobble address structure is needed.

An object of the present invention is to provide a recording medium, an address generation and detection method and a reproduction and recording device which allow expansion of a wobble address without performing large-scale reconstruction of the wobble structure.

Means for Solving the Problems

In order to solve the above mentioned problem, a virtual bit which is expressed by presence/absence of information embedded in part or the entire of the wobble address and a difference between regulations and is not recorded on a disc is generated.

Effect of the Invention

According to the present invention, address expansion becomes possible with a bit configuration of a conventional wobble address structure left as it is.

MODES FOR CARRYING OUT THE INVENTION

Hereinafter, embodiments of the present invention will be described with reference to the drawings.

Figure 1:
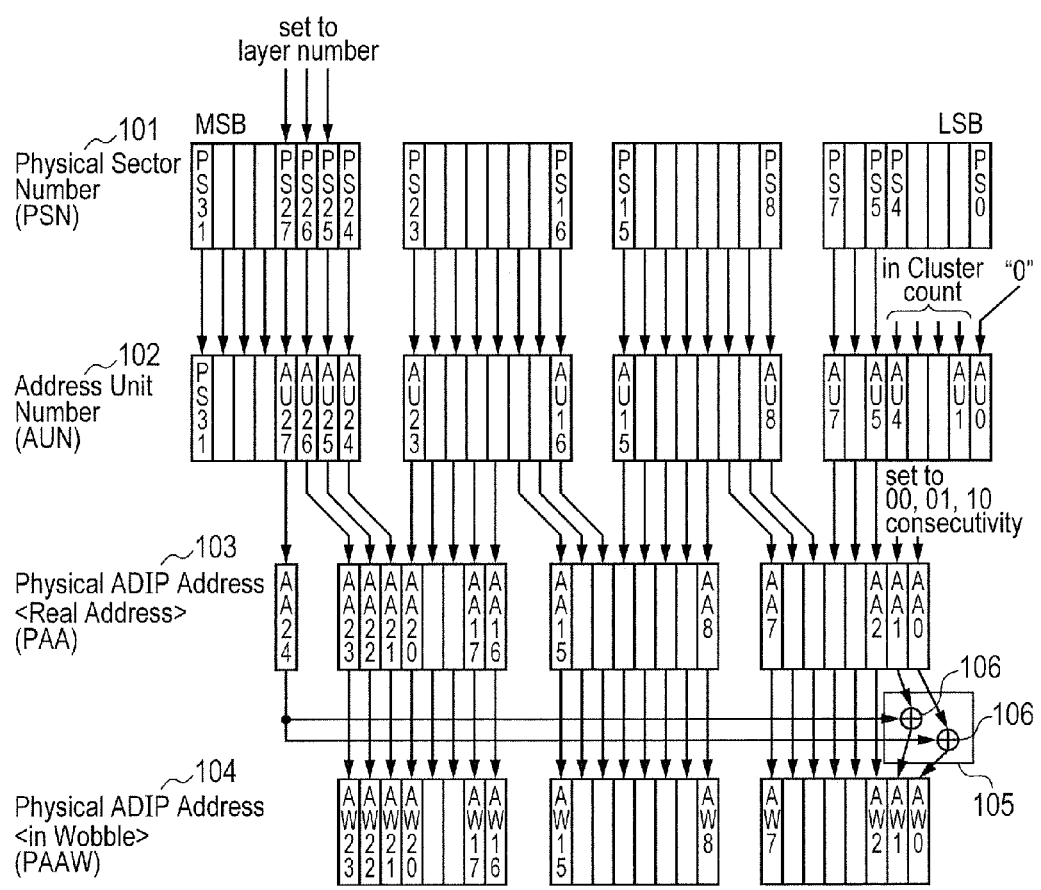
FIG. 1 is a correlation diagram of addresses of a multi-layer optical disc which is a first embodiment of the present invention.

FIG. 1 is a correlation diagram of addresses of a multi-layer optical disc which is a first embodiment of the present invention. 101 denotes a Physical Sector Number (hereinafter, PSN) which is a physical sector number of a sector, 102 denotes an Address Unit Number (hereinafter, AUN) which is an address embedded in cluster-based data, 103 denotes an actual address (hereinafter, PAA) of a Physical ADIP Address which is a physical ADIP address by wobbling, 104 denotes an address (hereinafter, PAAW) which is actually embedded in wobbles of the Physical ADIP Address, 105 denotes a scramble circuit, and 106 denotes an exclusive OR (Ex-OR). Here, it is supposed that scrambling is one of arithmetic operating processes and means a process aiming for value conversion of each bit of an address and regularity conversion. An example in which high-order 3 bits of the PAA 103 are allocated to layer numbers and address expansion of 1 bit from a conventional 24-bit PAA has been made is shown. In addition, it is supposed that bit information of PAA24 which is a virtual bit for address expansion is embedded in wobbles in correspondence with low-order 2 bits of the PAA. When allocation is made so as to have a layer number of 3 bits, a cluster number of 19 bits, and an intra-cluster count value of 2 bits in a conventional 24-bit PAA structure, addresses can be allocated to data having a layer number up to 8 layers and a data capacity of 32 Gigabytes (64 Kilobytes×$2^{19}$) per layer. However, although addresses can be allocated to data of a data capacity of 64 Gigabytes (64 Kilobytes×$2^{20}$) per layer by expanding the cluster number to 20 bits in case of a high-density optical disc exceeding 32 Gigabytes per layer, since the bits for the layer number are reduced to 2 bits, address generation exceeding 5 layers becomes impossible. Thus, 1 bit is expanded as the layer number to generate an address up to 8 layers with 3 bits as usual.

Next, a method of generating the addresses shown in FIG. 1 will be described. In the address range of PSN 28 bits (the remaining 4 bits are not used), PAA 25 bits are allocated as the address range on wobbles. However, the number of bits of the address to be embedded in a disc using wobbles is limited to 24 bits, so that information on the PAA24 which is the most significant bit is embedded in another bit as a virtual address bit. In case of the present embodiment, the PAA24 is input as a control bit for determining ON/OF of a scrambling process of the scramble circuit 105 and PAA1-0 of low-order 2 bits is subjected to the scrambling process and embedded in wobbles. A method using the exclusive OR 106 is used as an example of the scramble circuit for an arithmetic operating process of embedding information. Thus, if the PAA24 is "0", the PAA1-0 will be counted as 0, 1, 2, 0, 1, 2, ... as conventionally, and if the PAA24 is "1", it will have an exclusive-ORed value and hence will be counted as 3, 2, 1, 3, 2, 1, .... That is, the regularity (repetition of increments or not) in counting the PAA1-0 is changed in accordance with the virtual bit PAA24. Thus, embedding of the virtual bit PAA24 in wobbles is avoided by actually embedding PAAW1-0 output from the scramble circuit 105 in wobbles. As an effect, address expansion becomes possible with the bit number of the conventional wobble address left as it is.

Figures 2, 3:
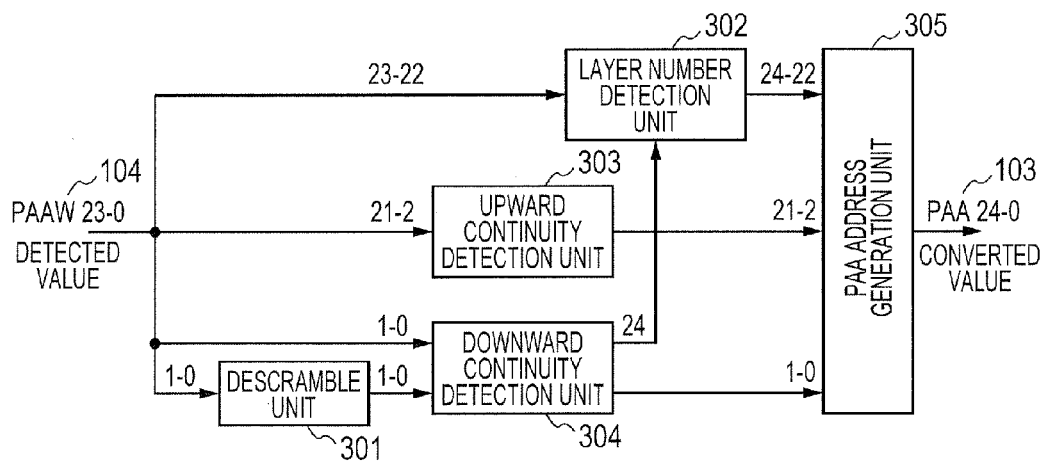
FIG. 2 is a timing chart of address detection in the first embodiment of the present invention.
FIG. 3 is a detection circuit diagram for address detection in the first embodiment of the present invention.

Next, a method of detecting the address PAAW embedded in wobbles will be described by using examples in a timing chart in FIG. 2 and a detection circuit diagram in FIG. 3. As the method of detecting the wobble address, address generation is made by continuously detecting the address protectively in consideration of erroneous detection and non-detection. Thus, the continuity of the low-order address of the PAAW (i.e. PAAW1-0) is checked to restore the PAA24 which is the virtual bit. The address PAAW1-0 detected from wobbles and address bits 1-0 descrambled by a descramble circuit 301 are input into a downward continuity detection circuit 304 in FIG. 3. Since it is scrambled by the exclusive OR 106 in generation of the address, a result of exclusive-OR operation of "1" and the PAAW1-0 is regarded to have been descramble-operated and is output in the descramble circuit 301. Since the virtual bit PAA24 is allocated to the third bit of the layer number, a result of detection is different between layer numbers 0-3 (201) and layer numbers 4-7 (202). In case of the layer numbers 0-3 (201), since the PAAW1-0 is input into the downward continuity detection circuit 304 as 0, 1, 2, 0, 1, 2, ..., "0" is output as the PAA24 and the PAAW1-0 is output as it is as the PAA1-0. On the other hand, in case of the layer numbers 4-7 (202), the PAAW1-0 is input into the downward continuity detection circuit 304 as 3, 2, 1, 3, 2, 1, .... Here, that a scrambling process has been performed in address generation is detected by detecting the detection value "3" of the address and detecting decrements in continuity, and the PAA24 is output as "1". In addition, with respect to the low-order bit PAA1-0, 0, 1, 2, 0, 1, 2, ... which is the value obtained after the PAAW1-0 has been descrambled is to be output. Thus, the intra-cluster count value (the PAA1-0) is detected as an output from the downward continuity detection circuit 304, and generation of the layer number address (PAA24-22) and detection of the layer number are made from a further generated PAA24 and PAAW23-22 detected from wobbles in a layer number detection circuit 302. In addition, generation of the cluster number address (PAA21-2) and detection of the cluster number are made from PAAW21-2 detected from wobbles in an upward address detection circuit 303. Therefore, the addresses obtained from the respective detection circuits 302, 303, 304 can be input into a PAA address generation circuit 305 and converted to the address of PAA24-0.

As described above, a virtual bit is embedded in another bit as information to generate an address and the address is restored upon detection, by which the bit number of the address indicating the physical position can be expanded without changing the address structure of wobbles and without increasing the number of bits of the address to be embedded in wobbles. In a physical ADIP address in a Blue-ray disc, as address allocation of a 2-bit layer number and a 20-bit cluster number, if the address of the layer number is expanded with a virtual bit, it can be applied to a disc having layer numbers up to 8 layers and reaching up to 64 Gigabytes. Similarly, in conventional address allocation of a 3-bit layer number and a 19-bit cluster number, if it is used in the case that the address of the layer number is to be expanded, it can be also applied to a disc having layer numbers up to 16 layers and reaching up to 32 Gigabytes per layer. Incidentally, since the virtual bit is controlled with the scrambling process OFF in case of the layer numbers 0-3 as in the present embodiment, PAA23-0 will have the same value as PAAW23-0 consequently. Therefore, it becomes possible to maintain compatibility with a conventional optical disc as well.

Figures 12, 13:
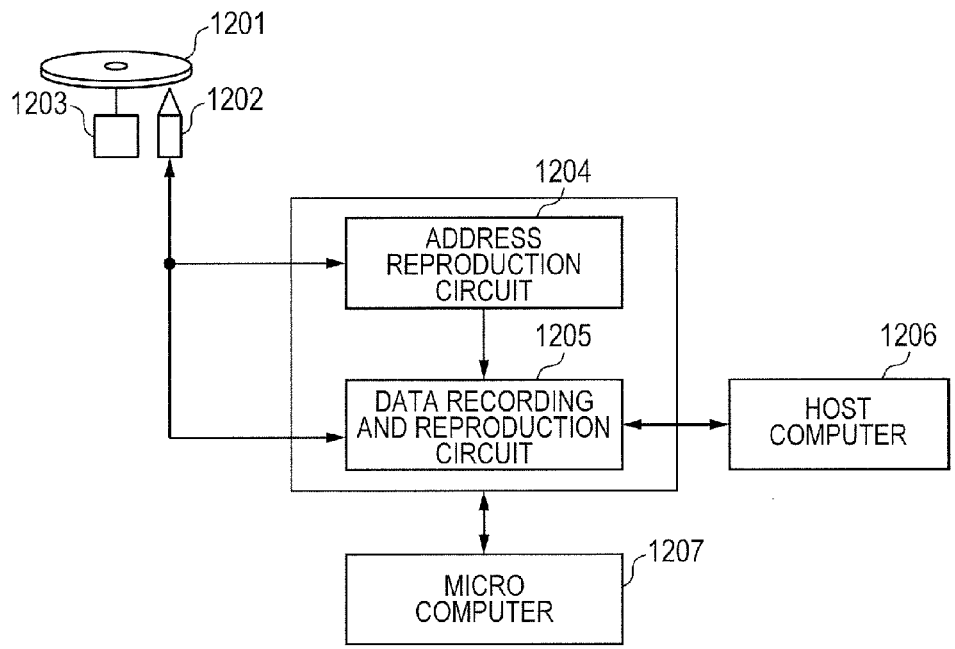
FIG. 12 is an optical disc recording and reproduction device which is the first embodiment of the present invention.
FIG. 13 is an address field structure diagram of a multi-layer optical disc.

In addition, an example of a recording and reproduction device that reproduces data from and records data on an optical disc which is prepared by address generation described in the present embodiment is shown in FIG. 12. 1201 denotes an optical disc, 1202 denotes a pick-up, 1203 denotes a spindle motor, 1204 denotes an address reproduction circuit, 1205 denotes a data recording and reproduction circuit, 1206 denotes an external host, and 1207 denotes a microcomputer for generally controlling the system. A wobble signal which has been read out from the optical disc 1201 prepared by using the address generating method shown in FIG. 1 via the pick-up 1202 is input into the address reproduction circuit 1204 and address information is detected. Owing to the above, it becomes possible to detect positions where the data is recorded and reproduced by configuring using an address detection circuit as described in FIG. 3, and data input into/output from the host 1206 of data obtained via the pick-up 1202 and the data recording and reproduction circuit 1205 and data recording and reproduction become possible.

Figures 4, 5:
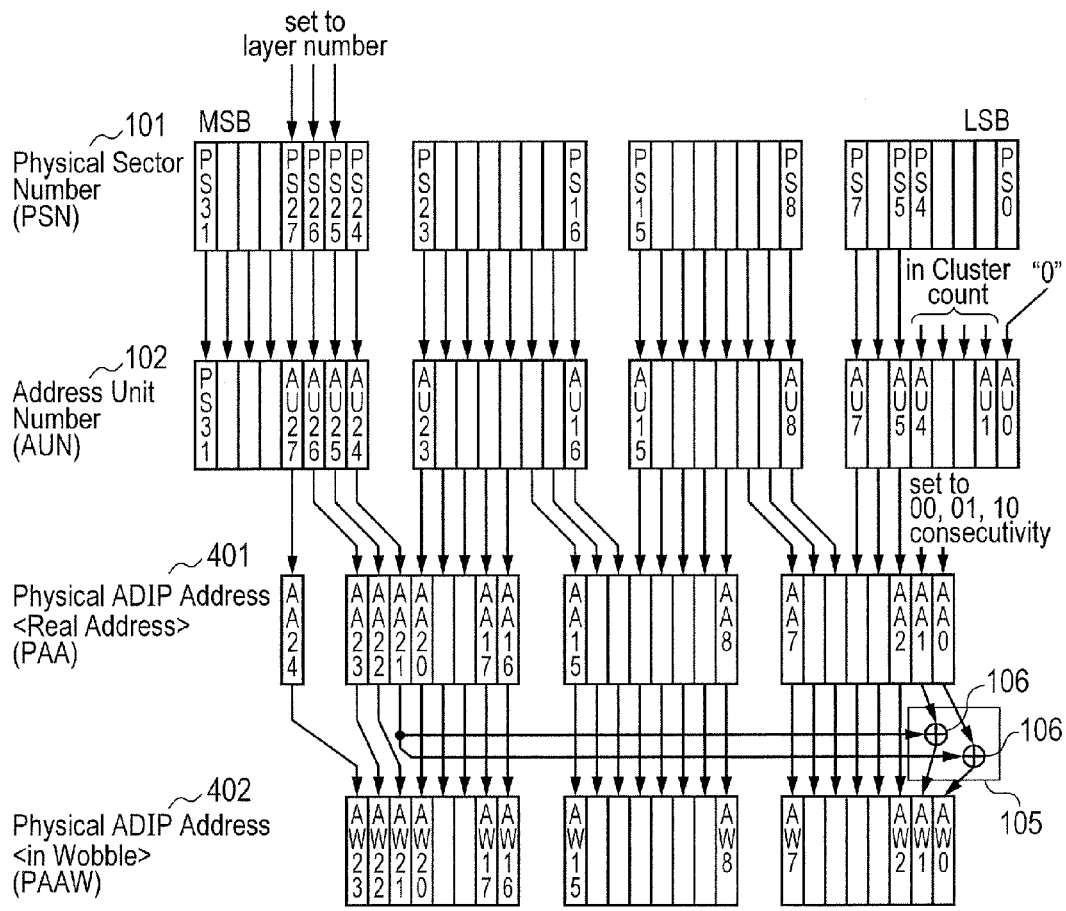
FIG. 4 is a correlation diagram of addresses of a multi-layer optical disc which is a second embodiment of the present invention.
FIG. 5 is a timing chart of address detection in the second embodiment of the present invention.

FIG. 4 is a correlation diagram of addresses of a multi-layer optical disc which is a second embodiment of the present invention. Similarly to the first embodiment, address expansion is made using a virtual bit which is not recorded on the disc. A point which is different from FIG. 1 is that not the PAA24, but PAA21 is allocated as a virtual bit. Although 401 denotes an actual address (hereinafter, PAA) of a Physical ADIP Address and 402 denotes a wobble-embedded address (hereinafter, PAAW) of the Physical ADIP Address similarly to FIG. 1, it is different only in bit allocation and others are the same as those in FIG. 1. As a method of generating an address, as in the first embodiment, the PAA21 is input as a control bit for determining ON/OFF of the scrambling process of the scramble circuit 105, and the scrambling process is performed on PAA1-0 of low-order 2 bits and it is embedded in wobbles. That is, the regularity (repetition of increments or not) in counting the PAA1-0 is changed in accordance with the virtual bit PAA21. As an effect, address expansion becomes possible with the bit number of the conventional wobble address left as it is.

Figure 6:
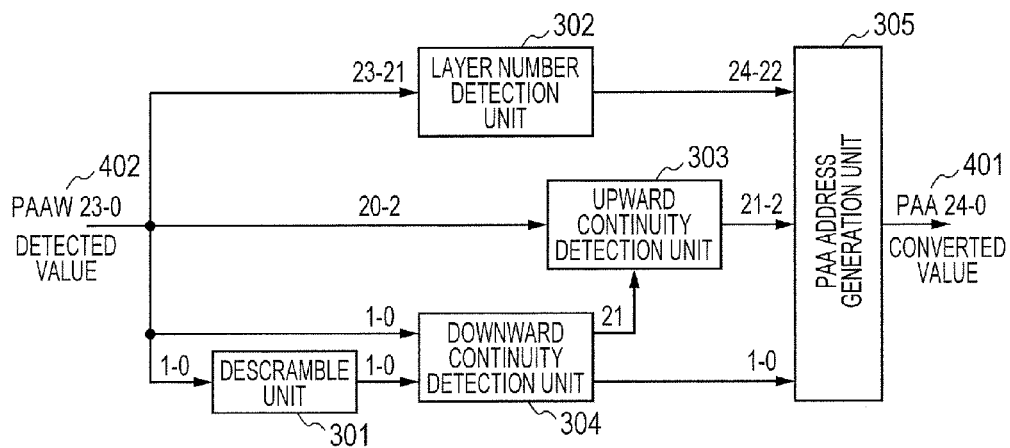
FIG. 6 is a detection circuit diagram for address detection in the second embodiment of the present invention.

A method of detecting the address PAAW embedded in wobbles will be described using examples in a timing chart in FIG. 5 and a detection circuit diagram in FIG. 6. In case of the present embodiment, since the virtual bit PAA21 is allocated not to the layer number address, but to the cluster number address, switching of address generation occurs in each layer.

In addition, as for a scrambling method which is an arithmetic operating process for embedding information as well, the PAA1-0 of low-order two bits is subjected to it by the exclusive-OR 106, so that whether the scrambling process is performed or not is detected in the downward continuity detection circuit 304 as in the above mentioned case to generate the virtual bit PAA21 and to detect the PAA1-0. Thus, the intra-cluster count value (the PAA1-0) is detected as an output from the downward continuity detection circuit 304, the cluster number address (PAA21-2) is generated and the cluster number is detected using the PAA21 detected by the downward continuity detection circuit 304 and PAAW 20-2 detected from wobbles, and the layer number address (PAA24-22) is detected using PAAW23-22 detected from wobbles. As a result, the addresses obtained from the respective detection circuits 302, 303, 304 can be input into the PAA address generation circuit 305 and converted to the address of the PAA24-0.

As described above, a virtual bit is embedded in another bit as information to generate an address and the address is restored upon detected, by which the bit number of the address indicating the physical position can be expanded without changing the address structure of wobbles and without increasing the number of bits of the address to be embedded in wobbles. Even when the virtual bit is allocated not to the layer number, but to the cluster number address of each layer unlike the first embodiment, generation and detection can be made similarly. In addition, it becomes possible to detect positions where data is recorded and reproduced by using the address detection circuit described in FIG. 6, also in a reproduction device that reproduces data from an optical disc prepared by address generation described in the present embodiment and a recording device that records data on the optical disc similarly to FIG. 12.

Figure 7:
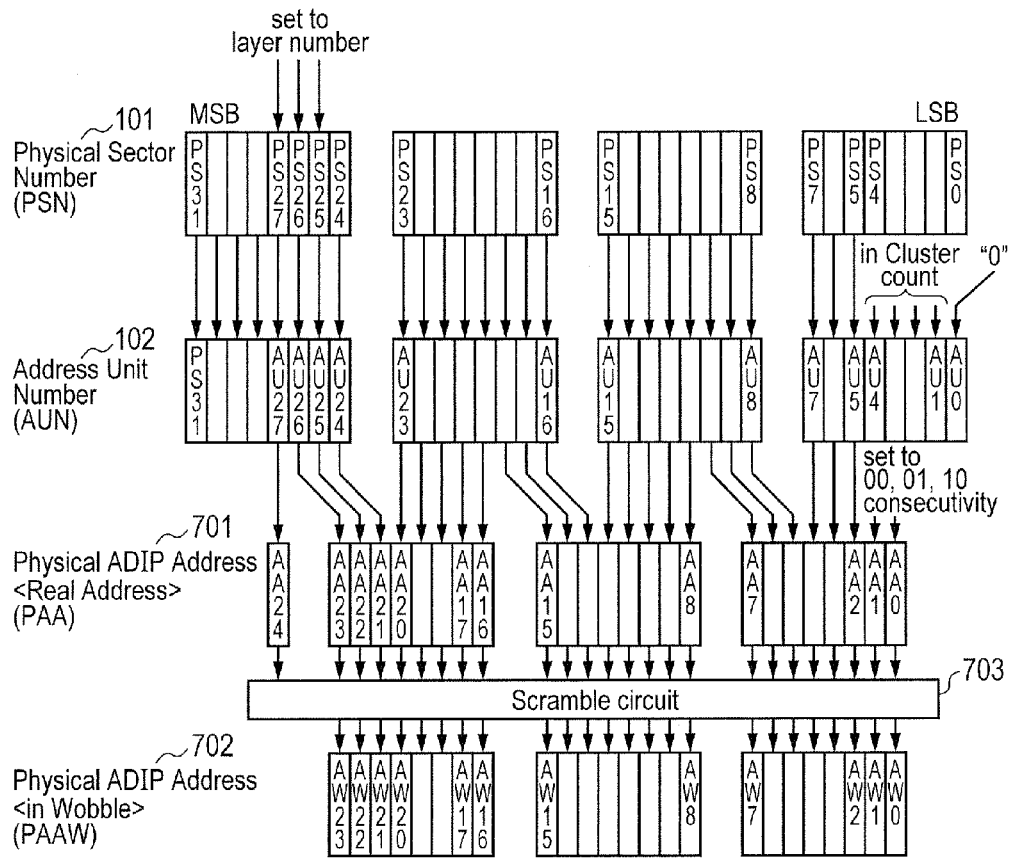
FIG. 7 is a correlation diagram of addresses of a multi-layer optical disc which is a third embodiment of the present invention.
Figure 8:
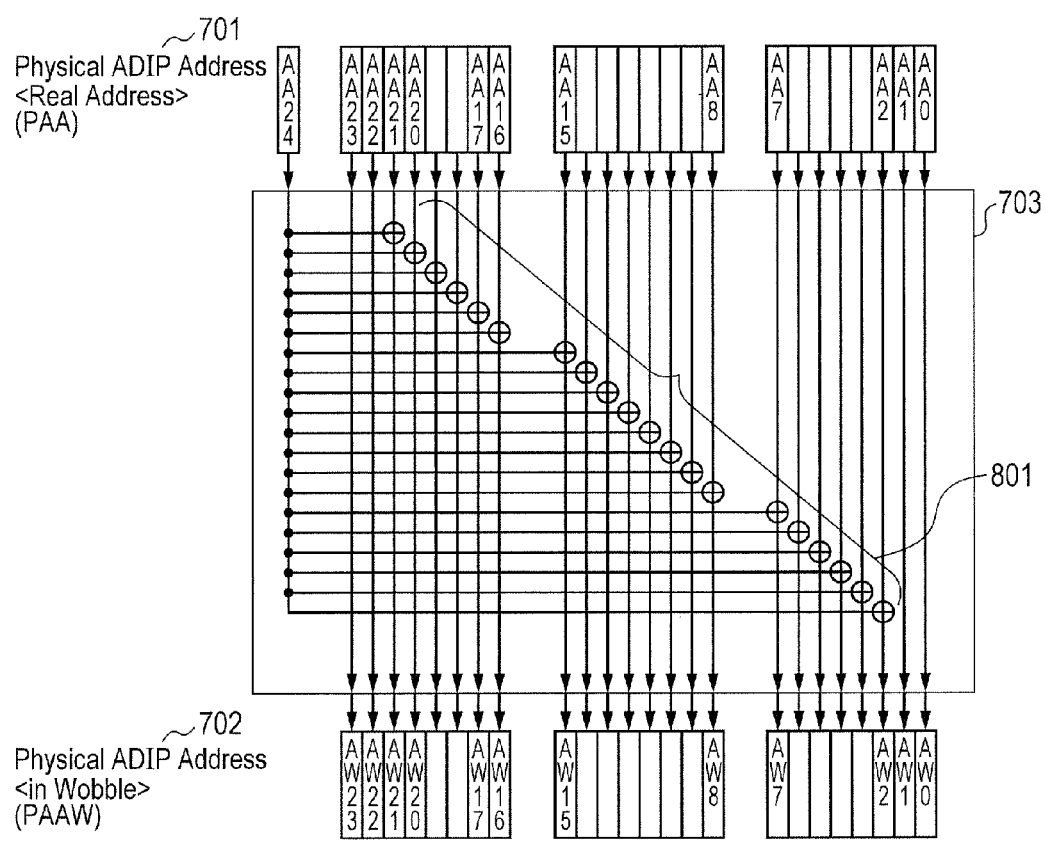
FIG. 8 is an example of a scramble circuit which is the third embodiment of the present invention.

FIG. 7 is a correlation diagram of addresses of a multi-layer optical disc which is a third embodiment of the present invention. As in the first embodiment, address expansion is performed by using a virtual bit which is not recorded on the disc. It is different from FIG. 1 in that as a scrambling method, it is performed not only on the PAA1-0 of low-order two bits but also on all bits of PAA23-0. Although 701 denotes an actual address (hereinafter, PAA) of a Physical ADIP Address, 702 denotes a wobble-embedded address (hereinafter, PAAW) of the Physical ADIP Address, and 703 denotes a scramble circuit similarly to FIG. 1, it is different only in bit allocation and others are the same as these in FIG. 1. An example of the scramble circuit 703 for an arithmetic operating process of embedding information is shown in FIG. 8 as a method of generating addresses. In the case in FIG. 8, it is supposed that the exclusive-OR 106 is used between each bit of the PAA21-2 corresponding to the cluster number address and the PAA24 and other bits are input and output as they are. Thus, if the PAA24 is "0", the PAA21-2 will be incremented as 0, 1, 2, 3, 4, 5, . . . , FFFFFh as conventionally, and if the PAA24 is "1", it will have a scrambled value and hence will be decremented as FFFFFh, FFFFEh, FFFFDh, . . . , 0. That is, the regularity in counting the PAA21-2 is changed in accordance with the virtual bit PAA24. As an effect, address expansion becomes possible with the bit number of the conventional wobble address left as it is.

Figure 9:
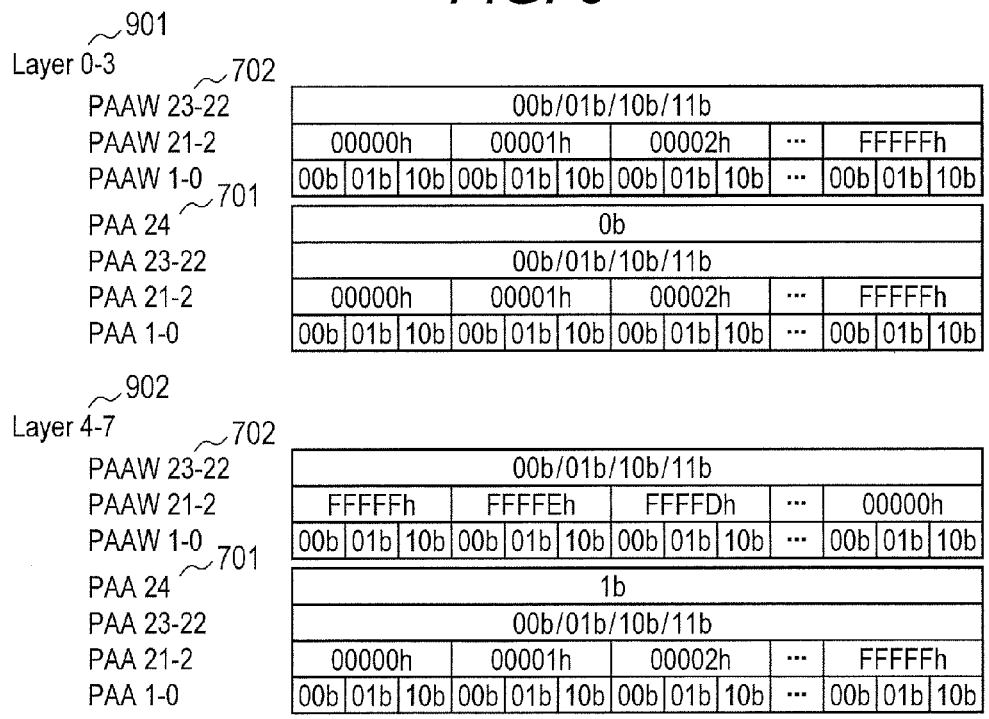
FIG. 9 is a timing chart of address detection in the third embodiment of the present invention.
Figure 10:
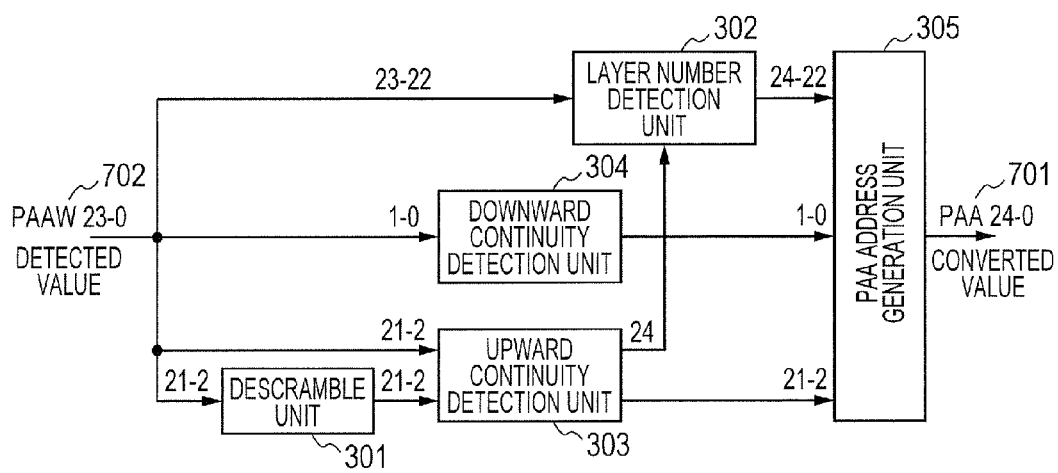
FIG. 10 is a detection circuit diagram for address detection in the third embodiment of the present invention.

A method of detecting the address PAAW embedded in wobbles will be described by using examples in a timing chart in FIG. 9 and a detection circuit diagram in FIG. 10. In case of the present embodiment, the PAA24 which is a virtual bit is restored by checking the continuity of an upper address of PAAW21-2. As for a scrambling method, since the PAA21-2 of high-order 20 bits is subjected to it by the exclusive-OR 106, so that whether scrambling is performed or not (in this example, a difference in continuity between increment and decrement) is detected by the upward continuity detection circuit 303 to generate the virtual bit PAA24 and to detect the PAA 21-2. In case of layer numbers 0-3 (901), since the PAAW21-2 is input into the upward continuity detection circuit 303 as 0, 1, 2, 3, 4, 5, . . . , FFFFFh, "0" is output for the PAA24 and PAAW21-2 is output as it is for the PAA21-2. On the other hand, in case of layer numbers 4-7 (902), since the PAAW21-2 is input into the upward continuity detection circuit 303 as FFFFFh, FFFFEh, FFFFDh, . . . , 0, it detects decrement to output the PAA24 as "1", and to output 0, 1, 2, 3, 4, 5, . . . , FFFFFh which is a scrambled value (in this example, an exclusive-ORed value between "1" and the PAAW21-2). Thus, as outputs from the upward continuity detection circuit 303, generation of the cluster number address (the PAA21-2) and detection of the cluster number can be made. Further, generation of the layer number address (PAA24-22) and detection of the layer number are made from the generated PAA bit24 and the PAAW23-22 detected from wobbles by the layer number detection circuit 302. In addition, detection of the intra-cluster count value (PAA1-0) is made from the PAAW1-0 detected from wobbles by the downward address detection circuit 304. Thus, the addresses obtained from the respective detection circuits 302, 303, 304 can be input into the PAAW address generation circuit 305 and converted to the address of the PAA24-0.

As described above, a virtual bit is embedded in another bit as information to generate an address and the address is restored upon direction, by which the bit number of the address indicating the physical position can be expanded without changing the address structure of wobbles and without increasing the number of bits of the address to be embedded in wobbles. Differently from the first embodiment, generation and detection can be similarly made even when the information of the virtual bit is embedded not only in part of the address but also in the entire as the position where it is to be embedded. In addition, it becomes possible to detect positions where data is recorded and reproduced by using the address detection circuit described in FIG. 10, also in a reproduction device that reproduces data from the optical disc prepared by address generation described in the present embodiment and a recording device that records the data on the optical disc similarly to FIG. 12.

Figure 11:
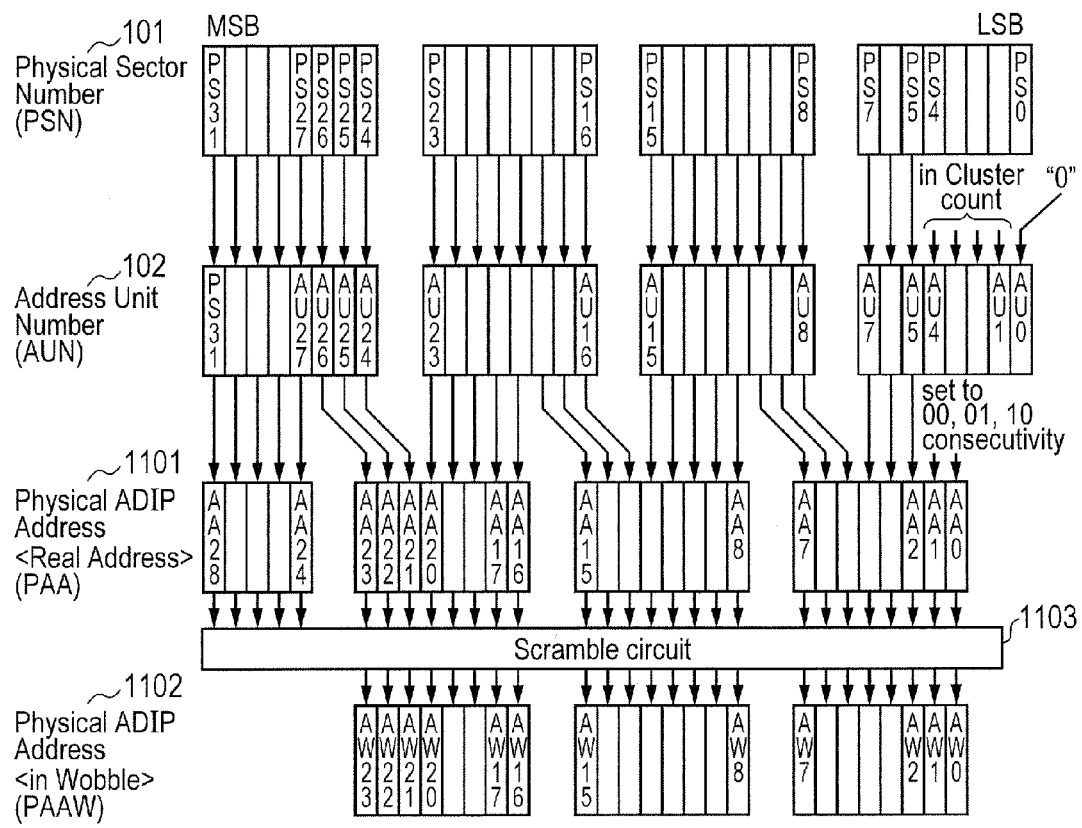
FIG. 11 is a correlation diagram of addresses of an optical disc which is a fourth embodiment of the present invention.

FIG. 11 is a correlation diagram of addresses of an optical disc which is a fourth embodiment of the present invention. It is different from FIG. 7 in that 5-bit PAA28-24 is used as a virtual bit corresponding to PSN31-27, and as a configuration of the PAA 103, PAA28-2 is allocated as the cluster number and PAA1-0 is allocated as the intra-cluster count value. Although, similarly to FIG. 7, 1101 denotes an actual address (hereinafter, PAA) of a Physical ADIP Address, 1102 denotes a wobble-embedded address (hereinafter, PAAW) of the Physical ADIP Address, and 1103 denotes a scramble circuit, it is different only in bit allocation and others are the same as those therein. Information is embedded in a plurality of kinds of formats as scramble regulations of the scramble circuit 1103 and the respective scramble regulations (in the present embodiment, since 5 virtual bits are added, $2^5=32$ sets) are detected and switched, by which generation and detection of a plurality of virtual bits can be made similarly. That is, the regularity in counting the PAA23-0 is changed in accordance with the virtual bit PAA28-24. As an effect, address expansion becomes possible with the bit number of the conventional wobble address left as it is.

As described above, a virtual bit is embedded in another bit as information to generate an address and the address is restored upon detection, by which the bit number of the address indicating a physical position can be expanded without changing the address structure of wobbles and without increasing the number of bits of the address to be embedded in wobbles. Differently from the first to third embodiments, generation and detection can be similarly made even when a plurality of bits are expanded as virtual bits not limited to expansion of only one bit. In addition, although, in the present embodiment, description has been made by using the address configured by only the cluster number, in contrast to the address configured by the layer number and the cluster number in the first to third embodiments, generation and detection can be similarly made. In addition, it becomes possible to detect positions where data is recorded and reproduced also in a reproduction device that reproduces data from an optical disc prepared by address generation described in the present embodiment and a recording device that records the data on the optical disc similarly to FIG. 12.

Figure 14:
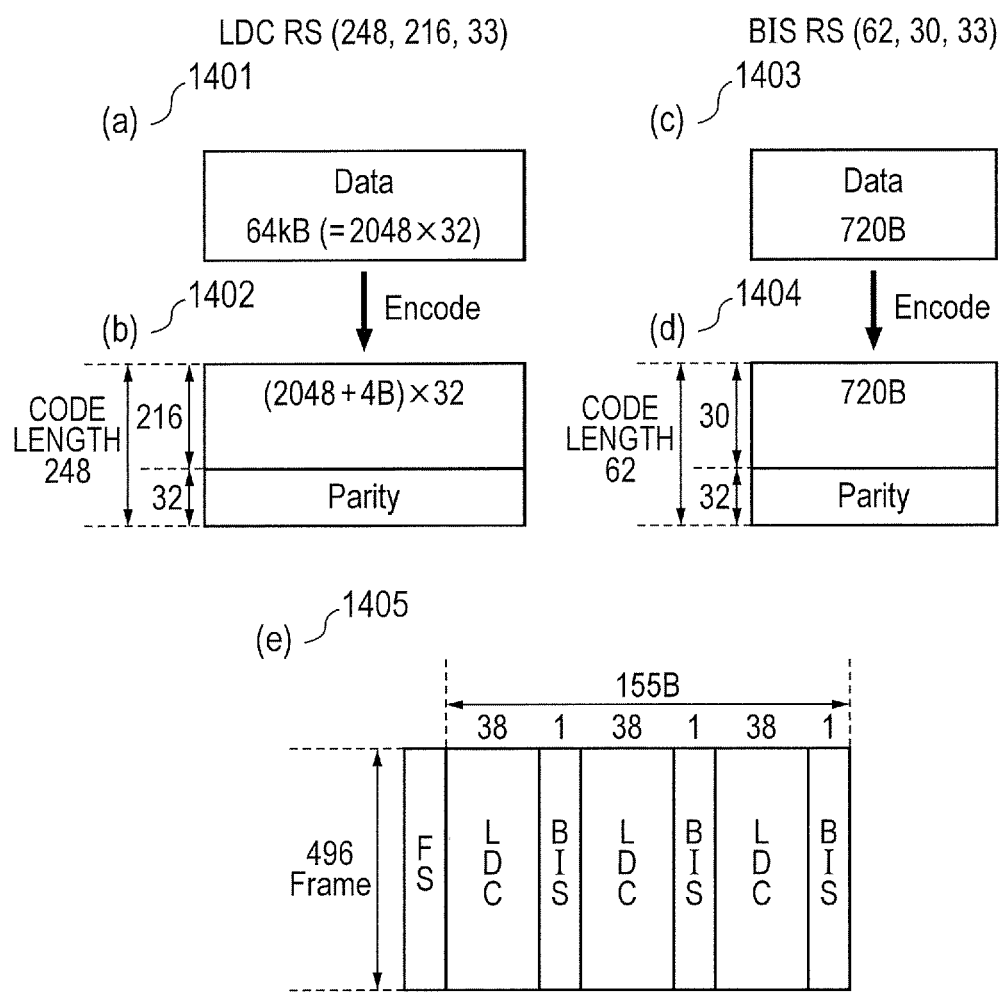
FIG. 14 is a diagram of a data structure, an ECC structure and a frame structure of a multi-layer optical disc.

FIG. 13 and FIG. 14 are diagrams showing an AUN structure, a data structure, an ECC structure and a frame structure used in a fifth embodiment of the present invention. An LDC (Long Distance Code) and a BIS (Burst Indicator Subcode) for main data (2048 bytes per sector×32 sectors) are included in a cluster which is a unit for recording and reproduction. 64-kilobyte main data shown in FIG. 14(a) is ECC-encoded as shown in FIG. 14(b). A 4-byte EDC (Error Detection Code) is added to each 2048-byte sector of the main data to LDC-encode 32 sectors. In addition, 720B data of the BIS shown in FIG. 14(c) is ECC-encoded as shown in FIG. 14(d) as numerical value relation which is suited to be used as a Burst Indicator of the main data. Further, data of 248×304 bytes shown in FIG. 14(b) is sorted to LDC data of 152×496 bytes by a predetermined interleaving process, and data of 62×24 bytes shown in FIG. 14(d) is sorted to BIS data of 3×496 bytes by a predetermined interleaving process. Then, a synchronization signal (Frame SYNC, FS) is added to LDC data of 38×3 bytes (152 bytes) and BIS data of 1×3 bytes (3 bytes) to configure 1 frame and a cluster is configured by data of 496 frames in all as shown in FIG. 14(e). Here, the AUN as an address to be added in units of clusters has an Address Field (hereinafter, AF) structure shown in FIG. 13 and is included in the 720-byte BIS data structure. A 4-byte parity (AF5-AF8) 1302 for error correction is added to the 4-byte AUN (AF0-AF3) 102 and 1-byte flag bits (AF4) 1301 to configure the AF structure with 16 addresses. Thus, 16 AUNs are allocated to 32 sectors (32 PSNs) of the cluster structure.

An address generating method for two kinds of addresses which are allocated in units of sectors will be described using the correlation diagram of addresses of the multi-layer optical disc shown in FIG. 1. For example, a case in which addresses are allocated to data of layer numbers up to 8 layers and a data capacity of 64 Gigabytes per layer is supposed. Although 28 bits are needed in all for allocation of the layer numbers up to 8 layers and the data capacity of 64 Gigabytes with the PSN 101 allocated to 1 sector, since 32 bits are originally prepared for the PSN, address bit expansion is not needed from when it exceeds a data volume expressed by 27 bits and it can be readily handled by shifting allocation of the address bit indicating each layer number. In addition, also in case of the AUN 102 in which 16 addresses are allocated to a cluster structure configured by the PSN 101 of 32 sectors, 28 bits will be also needed. As apparent from FIG. 13, since in the AUN 102, the AF structure is configured originally by using the 4-byte (32-bit) address bit, any address bit is not expanded. Thus, since the address of the AUN 102 is not changed from a conventional address structure, switching between it and the conventional address structure is not needed. In addition, in a BIS 1404 which is configured using the AUN, since a 32-byte parity is originally added to 30 bytes and hence an ECC which is stronger than parity addition to user data of an LDC 1402 is afforded, reliability can be maintained high. On the other hand, since it is difficult for the PAA (the PAAW 104) to be embedded in wobbles to allocate an address to the data of layer numbers up to 8 layers and a data capacity of 64 Gigabyte per layer in the conventional 24-bit structure, address expansion will be needed. Thus, as shown in FIG. 1, an address is generated by embedding a virtual bit which is not recorded on a disc not in a wobble, but in another bit as information and the address is restored upon detection, by which periodicity can be further maintained without changing the address structure of the wobble and the address indicating the physical position can be expanded without increasing the number of bits of the address to be embedded in wobbles.

As described above, when address expansion becomes necessary owing to densification of the data capacity or the like, in the case that the bit number of the address is small as in the PAA and hence expansion is difficult, an expansion bit (a virtual bit) which is not recorded on a disc is used and embedded in another bit as information, by which address expansion becomes possible without greatly changing the address structure and the periodicity. In addition, since the bit number of the address is sufficient as in the AUN and expansion of a bit which can be updated in a cluster period such as an address flag or the like is possible, addition of bit allocation is possible without changing the periodicity and hence address expansion and regularity conversion are not made, by which affinity with the PSN, compatibility with a conventional address and reliability can be maximally maintained.

Although in the above embodiments, description has been made by using scrambling as an information embedding method and by using an example (105 in FIG. 1, 105 in FIG. 4, 703 in FIG. 7 and FIG. 8) as the scramble circuit, it is not limited to this circuit and circuits and methods by which information embedding and information detection can be made by bit manipulation in accordance with whether scrambling is performed or not and a difference in scramble regularity are similarly applicable. Incidentally, although scrambling has been described as a process for manipulating bits of an address converting its value, scrambling means one of arithmetic operating processes and any process is applicable not limited to scrambling as long as it is a process for converting each bit of an address and converting the regularity thereof.

In addition, also with regard to the number of virtual bits, a position where a bit of the virtual bit is arranged, a bit position where information such as scramble information is embedded, and a bit structure of an address, these are not limited to the present embodiment. However, as the position where the virtual bit itself is arranged, a position where the frequency at which it is changed as the address is lower is preferable when stability in detection is considered, and as the bit position where information such as scramble information is embedded, a position where the frequency at which it is changed as the address is higher is preferable when a detection time is considered.

In addition, although in the present embodiment, description has been made by using an optical disc as the recorded medium and an address embedded in wobbles as the address, these are not limited to the present embodiment and if such a concept that bits are reduced so as to reduce the number of bits of an address to be read relative to an generated address can be applied, application becomes possible similarly. Further, although the virtual bit has been described as the address which is not embedded in wobbles, it may be stored in an area different from an area of an address to be read and may be used upon address detection.

DESCRIPTION OF REFERENCE NUMERALS

101 . . . Physical Sector Number (PSN), 102 . . . Address Unit Number (AUN), 103 . . . Physical ADIP Address (PAA), 104 . . . Physical ADIP Address (PAAW), 105 . . . scramble circuit, 106 . . . exclusive OR, 301 . . . descramble circuit, 302 . . . layer number detection circuit, 303 . . . upward continuity detection circuit, 304 . . . downward continuity detection circuit, 305 . . . PAA address generation circuit, 401 . . . Physical ADIP Address (PAA), 402 . . . Physical ADIP Address (PAAW), 701 . . . Physical ADIP Address (PAA), 702 . . . Physical ADIP Address (PAAW), 703 . . . scramble circuit, 801 . . . exclusive OR, 1101 . . . Physical ADIP Address (PAA), 1102 . . . Physical ADIP Address (PAAW), 1103 . . . scramble circuit, 1201 . . . optical disc, 1202 . . . pick-up, 1203 . . . spindle motor, 1204 . . . address reproduction circuit, 1205 . . . data recording and reproduction circuit, 1206 . . . host, 1207 . . . microcomputer, 1301 . . . flag bits, 1302 . . . parities

The invention claimed is:

1. In an recording medium provided with a plurality of recording layers having areas where a plurality of clusters for recording data are recorded, the recording medium comprising:
   an area where a first address is recorded, the first address being added to a cluster for recording, the first address indicating identification of clusters and an intra-cluster position and a second address recorded, by being wobbling-superimposed on a track on which data is recorded in synchronization with the cluster, the second address indicating information including identification of clusters and an intra-cluster position;
   wherein the first address is an address which is recorded by being added to actual data, and wherein the first address is recorded after an error correction code is added to the first address;
   wherein the second address is an address indicating a physical recording position on the recording medium, and includes: a layer number address indicating numbers of the plurality of recording layers, a cluster number address indicating data positions of the plurality of clusters, and an intra-cluster count value for specifying a physical position of the cluster;
   wherein a virtual bit which indicates whether or not the regularity of low-order 2 bits of the second address is switched, and is used as an expansion bit of the cluster number address, and is not recorded on the recording medium is virtually imbedded in the second address; and
   wherein the regularity of low-order 2 bits indicates repetition of increments or not.

2. A recording method of recording data on the recording medium defined in claim 1, the recording method comprising:
   reading the recorded second address from the recording medium;
   restoring the virtual bit which is virtually embedded in the second address;
   detecting the second address on the basis of the restored virtual bit; and
   recording data on the recording medium with the detected second address.

3. A recording device for recording data on the recording medium defined in claim 1, the recording device comprising:
   a pick-up configured to read the recorded second address from the recording medium;
   an address reproduction circuit that configured to restore the virtual bit which is virtually embedded in the second address and detects the second address on the basis of the restored virtual bit; and
   a data recording circuit configured to record data on the recording medium with the detected second address.

4. A reproduction method of reproducing data from the recording medium defined in claim 1, the reproduction method comprising:
   reading the recorded second address from the recording medium;
   restoring the virtual bit which is virtually embedded in the second address;
   detecting the second address on the basis of the restored virtual bit; and
   reproducing data from the recording medium with the detected second address.

5. A reproduction device for reproducing data from the recording medium defined in claim 1, the reproduction device comprising:
   a pick-up configured to read the recorded second address from the recording medium;
   an address reproduction circuit configured to restore the virtual bit which is virtually embedded in the second address, and detects the second address on the basis of the restored virtual bit, and
   a data reproduction circuit configured to reproduce data from the recording medium with the detected second address.

6. An address recording method in a recording medium provided with a plurality of recording layers having areas where a plurality of clusters for recording data are recorded, the address recording method comprising:
   providing an area where a first address which is added to a cluster for recording and indicates identification of clusters and an intra-cluster position is recorded; and
   recording a second address which indicates information including identification of clusters and an intra-cluster position by wobbling-superimposing it on a track where data is recorded in synchronization with the cluster;
   wherein the first address is an address which is recorded by being added to actual data, and wherein the first address is recorded after an error correction code is added to the first address;
   wherein the second address is an address indicating a physical recording position on the recording medium, and includes: a layer number address indicating numbers of the plurality of recording layers, a cluster number address indicating data positions of the plurality of clusters, and an intra-cluster count value for specifying a physical position of the cluster;
   wherein a virtual bit which indicates whether or not the regularity of low-order 2 bits of the second address is switched, or not, and is used as an expansion bit of the cluster number address, and is not recorded on the recording medium is virtually imbedded in the address; and
   wherein the regularity of low-order 2 bits indicates repetition of increments or not.

* * * * *